United States Patent
Jünemann

(10) Patent No.: US 12,055,531 B2
(45) Date of Patent: Aug. 6, 2024

(54) METHOD AND DEVICE FOR CALIBRATING A GAS DETECTION DEVICE

(71) Applicant: bentekk GmbH, Lübeck (DE)

(72) Inventor: Arne Jünemann, Hamburg (DE)

( * ) Notice: Subject to any disclaimer, the term of this patent is extended or adjusted under 35 U.S.C. 154(b) by 365 days.

(21) Appl. No.: 17/586,409

(22) Filed: Jan. 27, 2022

(65) Prior Publication Data

US 2022/0236240 A1    Jul. 28, 2022

(30) Foreign Application Priority Data

Jan. 27, 2021   (DE) ..................... 10 2021 101 797.1

(51) Int. Cl.
  *G01N 30/86*   (2006.01)
  *G01N 30/02*   (2006.01)
  *G01N 30/16*   (2006.01)

(52) U.S. Cl.
  CPC ......... *G01N 30/8665* (2013.01); *G01N 30/16* (2013.01); *G01N 2030/025* (2013.01)

(58) Field of Classification Search
  None
  See application file for complete search history.

(56) References Cited

U.S. PATENT DOCUMENTS

| | | | |
|---|---|---|---|
| 2002/0139167 A1 | 10/2002 | Schram et al. | |
| 2014/0156202 A1* | 6/2014 | Floridia | H01J 49/0009 702/23 |
| 2015/0293066 A1* | 10/2015 | Hale | G01N 30/8665 73/1.02 |
| 2019/0353624 A1* | 11/2019 | Schmittmann | G01N 33/0062 |

FOREIGN PATENT DOCUMENTS

| | | | |
|---|---|---|---|
| CN | 112067719 A | * | 12/2020 |
| DE | 4305981 C2 | | 3/1999 |
| DE | 10114947 A1 | | 10/2002 |
| DE | 69635963 T2 | | 12/2006 |
| DE | 112015001848 T5 | | 12/2016 |
| EP | 1007959 B1 | | 3/2006 |
| WO | 2018/14147 A1 | | 8/2018 |

OTHER PUBLICATIONS

Office Action dated Jun. 23, 2023, directed to DE Application No. 102022101886.5; 14 pages.

* cited by examiner

*Primary Examiner* — Peter J Macchiarolo
*Assistant Examiner* — Jermaine L Jenkins
(74) *Attorney, Agent, or Firm* — McGlew and Tuttle, P.C.

(57) ABSTRACT

A method and a corresponding device for calibrating a gas detection device with a measuring chamber for generating a gas chromatogram. A sequence of at least two consecutive partial injections separated by a pause is carried out, each comprising a predetermined amount of a sample-gas mixture to be injected into the measuring chamber, and the gas detection device generates a measurement signal by means of gas chromatography. The measurement signal correlates with the presence and/or concentration of a component of the sample-gas mixture. Due to the different partial injections, a plurality of measurement signals can be obtained, which means that depending on these measurement signals the necessary information for a calibration can be obtained automatically even if the transfer function of the detector unit is non-linear. In this way, a rapid and automated calibration can be achieved, which means a double advantage for the user.

18 Claims, 2 Drawing Sheets

METHOD AND DEVICE FOR CALIBRATING A GAS DETECTION DEVICE

CROSS-REFERENCE TO RELATED APPLICATIONS

This application claims the priority of German Application No. 10 2021 101 797.1, filed Jan. 27, 2021, the entire contents of which are incorporated herein by reference.

FIELD OF THE DISCLOSURE

The invention relates to methods and devices for calibrating a gas detection devices that comprise a measuring chamber and is designed to generate a gas chromatogram from a gas mixture located in the measuring chamber.

BACKGROUND OF THE DISCLOSURE

In industry, occupational safety, environmental protection and scientific research, gas detection devices are used to determine the presence and concentration of chemical compounds in gas, particularly in the ambient air, or in closed volumes, often with the aim of detecting traces of substances that are harmful to the environment and health. For this purpose, either samples can be taken for later laboratory tests or measurements can be made directly on site with gas measuring devices. By using portable gas detection devices in particular, there is also the option of using high-performance measuring devices outside the laboratory, in particular for personnel in occupational health and safety or for (factory-based) fire departments, which were previously exclusively reserved for highly qualified laboratory analysis personnel.

The increasing availability of more complex measuring instruments creates new challenges for the conduct of the entire measurement procedure involving measuring instruments that are simultaneously compact and portable, in order to enable precise and repeatable measurements even in field tests without negating the advantages of a rapid-deployment device by the need for complicated preparation. In this respect, methods that perform a measurement on a known reference are particularly useful. A gas mixture with a known chemical composition and concentration is suitable as a reference. This can be stored in gaseous form in a container. Alternatively, the reference materials can be stored in the liquid state. The disadvantage of this is that it is not possible for every user to carry out such a calibration, and moreover, a complicated calibration process delays the application in the field, thereby reducing an important advantage over laboratory-based methods, namely the rapid availability of measurement results. For example, gas chromatographs (GC) are used to record a gas chromatogram in which the intensity at a detector is plotted against the retention time in a chromatography column. In mass spectrometers (MS), a mass spectrogram is recorded in which the frequency of substances is plotted as a function of their mass-charge ratio.

In order to allow this calibration to be carried out by the users themselves outside a laboratory, the applicant has proposed a method for extensively automated calibration supported by expert systems (WO 2018/141427 A1). This allows a high degree of support for the user to be achieved. However, non-linearities in particular cannot be taken into account, or are difficult to take into account.

Patent EP 1 007 959 B1 discloses a method for isotopic calibration. For this purpose, a reference gas is injected in a series of injections, each of which has a different length. For this purpose, the ion flows are measured and recorded as signal peaks. At least one of these is selected as the active reference peak. With this method a reliable isotopic calibration can be achieved with respect to C13 isotopes.

Document DE 101 14 947 A1 discloses a method and a device for producing a calibration gas. To provide the controlled introduction of a calibration component into a carrier gas, the calibration component is supplied in liquid form as microdroplets. The microdroplets are delivered via nozzles, which are implemented in piezo-technology. The microdroplets introduced into the carrier gas vaporize to form the gaseous calibration component. This method of producing calibration gas requires calibrated components; the document does not contain any teaching on how they are calibrated.

SUMMARY OF THE DISCLOSURE

An object of the invention is to provide a method and a device for calibrating a gas detection device, wherein the calibration is designed to be simpler than that in known methods and devices.

According to aspects of the invention, a method and a device for calibrating a gas detection device comprising a measuring chamber, wherein the gas detection device is designed to generate a gas chromatogram from a gas mixture in the measuring chamber, the method comprising the steps in which a sample-gas mixture is conveyed to the measuring chamber by means of a sequence comprising at least two consecutive partial injections, each partial injection of the sequence comprising the steps of: a specified amount of the sample-gas mixture is injected into the measuring chamber, and the gas detection device generates a measurement signal for the partial injection by means of gas chromatography, wherein the measurement signal for at least one component of the sample-gas mixture injected during this partial injection correlates with the presence and/or a concentration of that component, wherein between two consecutive partial injections of the sequence a pause is applied in which no sample-gas mixture is injected, and wherein the method comprises the further step in which the gas detection device is automatically calibrated depending on the generated measurement signals for the partial injections.

According to aspects of the invention, a sequence of consecutive partial injections is triggered for the calibration, wherein the partial injections follow each other with a time interval (pause). For each of the partial injections, a measure for the amount of the sample-gas mixture to be injected is given in each case, where the amounts are not necessarily the same. Instead, different amounts can be specified for the partial injections. The gas detection device generates a measurement signal for each partial injection. The gas detection device is automatically calibrated depending on these measurement signals. A plurality of measurement signals is thus obtained for the partial injections by means of gas chromatography, namely one measurement signal for each partial injection. This provides the necessary information for the calibration even if the transfer function of the gas detection device is non-linear, and this information is then used to calibrate the gas detection device automatically. For example, if a gas detection device with a photo-ionization detector (PID) is assumed to have a transfer function of the form $y = \alpha \cdot x^\gamma$ to determine a quantity of a substance y, where the parameter x denotes the measured sensor signal (measurement signal), $\gamma$ (gamma) is the exponent for the non-linearity, and $\alpha$ is a gain factor (response factor), then in order to determine and hence calibrate the two parameters $\alpha$ and $\gamma$, at least two partial injections are required. According to aspects of the invention, the parameters can be determined from the measurement signals of only a single sequence of the partial injections according to the invention, thus simplifying and speeding up the calibration.

It should be noted that for practical reasons it is often expedient to use the expression $x=v \cdot t_i$ for the measurement signal x of the gas detection device, where v stands for the sensor signal per unit time. Thus, using the injection time $t_i$ as a parameter, the transfer function is then given by $y=\alpha \cdot (v \cdot t_i)^\gamma$. Otherwise, reference is made to the known technical knowledge in the field of gas chromatography.

According to aspects of the invention, there is a pause between the partial injections of the sequence. This means that the partial injections do not overlap, rather no injection takes place during the pause. The at least two measurement signals together form a gas chromatogram. It may be provided that the pause is at least as long as the time corresponding to the duration of the broadest measurement signal peak in the gas chromatography. This ensures that in the gas chromatogram the measurement signals obtained during the calibration for the respective partial injections do not overlap each other, but remain separated in time.

The partial injections can be controlled or regulated using predefined settings, advantageously in such a way that the target injection amounts increase starting from the first partial injection, i.e. they become ever larger with successive partial injections of the sequence. However, this does not mean that all partial injections must necessarily be carried out with different amounts; additional partial injections can also be carried out with the same amount as one of the previous partial injections.

The same sample-gas mixture is used in the sequence of the partial injections. However, it is also possible to carry out multiple sequences of partial injections wherein at least two chemically different sample-gas mixtures can be optionally used for the sequences.

The measurement signals generated by the gas detection device typically have the shape of a peak (signal peak) when appropriately visualized (e.g. by means of a recorder, integrator or PC). Therefore, they are also referred to as peaks, signal peaks, or measurement signal peaks. If the peak of the measurement signal is unambiguous and does not merge with another peak, this is also referred to in the jargon as a "separable" measurement signal.

The invention also covers a corresponding device for calibrating a gas detection device, wherein the gas detection device comprises a measuring chamber and is designed to generate a gas chromatogram from a gas mixture in the measuring chamber, wherein the device for calibration comprises an injection unit and a serial impact generator, the injection unit being designed to inject a sample-gas mixture into the measuring chamber, and wherein the serial impact generator is designed to control the injection unit in such a way that the controlled injection unit performs a sequence of at least two consecutive partial injections, wherein the controlled injection unit is designed to inject a specified amount of the sample-gas mixture into the measuring chamber in each partial injection, wherein the gas detection device is designed to generate a measuring signal for each partial injection by means of gas chromatography, wherein the measuring signal for at least one component of the sample-gas mixture injected during this partial injection correlates with the presence and/or concentration of this component, wherein the serial impact generator is designed to control the injection unit in such a way that between two consecutive partial injections of the sequence a pause is applied in which the injection unit does not inject a sample-gas mixture, and wherein the device for calibration is designed to calibrate the gas detection device automatically depending on the generated measurement signals for the partial injections. For further elucidation, reference is made to the above description of the calibration method to avoid repetition. Preferably, the gas detection device comprises a separation column and a detector.

Furthermore, the invention covers a gas detection device comprising a measuring chamber and the device for calibration, wherein the gas detection device is designed to generate a gas chromatogram from a gas mixture located in the measuring chamber. The device for calibration is advantageously designed as a component of the gas detection device, which is preferably portable. In particular, it is conveniently integrated into structurally. This provides the user with a user-friendly and reliable means of calibration, so that they can carry out the necessary calibration without any significant extra effort. This is a significant advantage as it reduces the risk that no calibration or no measurements will take place at all due to a lack of user ability or calibration facilities. It is particularly preferred if the gas detection device is designed as a unit that a user can carry in one hand. This allows the application and calibration to be carried out in the field in a simple and convenient way.

It is preferably provided that in two different partial injections of the sequence of partial injections at least two different amounts of the sample-gas mixture and/or two amounts of the sample-gas mixture are injected during two different time periods. This enables comprehensive usage for different applications.

Advantageously, the sequence comprises a first, a second and a third partial injection, the second partial injection starting after the end of the first partial injection and the third partial injection starting after the end of the second partial injection.

It is convenient to control or regulate the intended partial injection amounts in such a way that they increase starting from the first of the partial injections.

Advantageously, the sequence comprises a first, a second and a third partial injection, the second partial injection beginning after the end of the first partial injection and the third partial injection beginning after the end of the second partial injection. This provides a further, third, measurement signal. From these, up to three parameters can be determined for calibration. This is a significant advantage as the injection units used for the injecting often have a dead volume. In the case of small injection amounts or short injection times, the dead volume becomes relevant to accuracy. The length of time that must be spent on the dead volume during injection is called the dead time $t_{tot}$. This must be taken into account to increase the accuracy, especially in the case of small injection amounts and/or short injection durations. In order to be able to determine another parameter, namely $t_{tot}$, the third partial injection is important. The corresponding extended transfer function for the detector unit is given by $y=\alpha \cdot (v \cdot (t_i - t_{tot}))^\gamma$. Advantageously, four partial injections or more can also be optionally provided in order to obtain a measure for the reproducibility of the measurement and analysis procedure to be calibrated and thus of the gas detection device. In particular, the minimum amount of the injection amount of a partial injection is at least as large as the dead volume. In other words: the minimum time required for a partial injection is at least as long as the dead time $t_{tot}$.

Preferably, the second partial injection lasts longer than the first partial injection and/or a larger amount is injected during the second partial injection than during the first partial injection, and/or the third partial injection takes longer than the second partial injection and/or a larger amount is injected during the third partial injection than during the second partial injection. It is advantageous that in the second partial injection the amount injected is at least one and a half times, preferably twice as large as in the first partial injection, and in the third partial injection the amount injected is at least one and a half times, preferably twice as large as in the second partial injection. Such increasing time periods of the partial injections are beneficial for improving the separation of the measurement signals for the partial injections determined by gas chromatography. Thus, even if "tailing" of the measurement signals occurs in the gas chromatography, with the increasing injection amounts sufficient reliability is achieved with regard to the separation of the measurement signals of the partial injections. This has the advantage that even in difficult measurement conditions which produce a significant "tailing" in the gas chromatogram, in many cases an undesirable overlapping between the peaks from the various partial injections can be effectively prevented, thus avoiding an undesirable deterioration of the measurement quality. "Tailing" refers to the asymmetry of a peak, in which the (temporally following) "trailing portion" of the peak is less steep than the "leading portion". In the case of multiple components in the sample-gas mixture, a longest expected retention time of the gas detection device can be determined based on the retention time of the gas chromatography for the component in the sample-gas mixture that runs at the slowest speed. Advantageously, the time that elapses between the start of the first partial injection and the end of the last partial injection can then be less than the longest expected retention time of a component of the sample-gas mixture. This effectively prevents saturation of the gas chromatography.

It is preferable that the amount injected in the second partial injection is greater by a factor than the amount injected in the first partial injection, and the amount injected in the third partial injection is greater than the amount injected in the second partial injection by the same factor, where the factor is greater than or equal to two. In this case, the target injection quantities are graduated according to a sequence defined by the factor. This can be used to simplify the calculation of parameters important for the calibration. This applies in particular to the graduation according to an exponential sequence. This means that in the above-mentioned transfer function $y=\alpha \cdot (v \cdot t_r)^\gamma$ a linearity is created with respect to the parameter $\gamma$ due to the relation $\log (x^\gamma) = \log (x) \cdot \gamma$. This simplifies the calculation. In particular, a regression calculation can be used for this purpose, preferably using the Levenberg-Marquardt algorithm. It goes without saying that with four or more partial injections, the sequence is advantageously continued with the same factor.

It is expedient for each partial injection to be assigned at least one evaluation period. The step in which the gas detection device generates the measurement signal for a partial injection comprises the step in which the gas detection device generates at least one measurement signal per evaluation period by sampling in at least one evaluation period, preferably in each evaluation period assigned to the partial injection. In this way, at least one separate measurement signal can be generated for each partial injection and each evaluation period.

In addition, it is advantageously provided that in each partial injection, a mixture comprising a first sample-gas component and a second sample-gas component is injected as the sample-gas mixture, so that in each partial injection at least both the first sample-gas component and the second sample-gas component are injected, the second sample-gas component being different from the first sample-gas component, and wherein each partial injection is assigned a first evaluation period and a second evaluation period, wherein each measurement signal generated by sampling in the respective first evaluation period relates to the first sample-gas component and each measurement signal generated by sampling in the respective second evaluation period relates to the second sample-gas component.

Due to the respective separate evaluation periods for the sample-gas components, distortions of the measurement signals for one sample-gas component can be reduced by measurement signals for another sample-gas component. By this method, the separability of the measurement signals obtained can be significantly improved.

In addition, it may be provided that a temporal gap occurs between the two first evaluation periods assigned to two directly consecutive partial injections, and the two second evaluation periods assigned to two directly consecutive partial injections overlap in time. This ensures that the evaluation periods for the first sample-gas component do not overlap, which further increases the accuracy of the measurement, while the evaluation periods of the later, second sample-gas component are allowed to overlap in time since the corresponding measurement signals can be easily separated from each other by computation. In this way, a favourable combination is achieved of relatively high measurement accuracy while avoiding interleaving of measurement signals with rapid measurement without unnecessarily large time intervals between the partial injections. This can be further improved by optionally allowing a time gap to occur between the first evaluation period and the second evaluation period that are both assigned to the same partial injection.

Preferably, for each partial injection an expected measurement signal is specified for the amount of the sample-gas mixture injected during this partial injection and the measurement signal generated for this partial injection is compared with the expected measurement signal, wherein the step of calibrating the gas detection device depending on the generated measurement signals comprises the step that the gas detection device is calibrated depending on the results of the comparison for the partial injections. The expected measurement signal provides information about what the result of the gas chromatogram should look like. This creates a reference with which the actually generated measurement signal can be compared. The calibration depends on this comparison. This is preferably automated. This can be used to create a quality control in which actually generated measurement signals that diverge greatly from the expected measurement signal (e.g. outside a 3-sigma range or a confidence interval defined otherwise) are rejected and/or need to be confirmed by a repeated measurement (negative case). If, on the other hand, the actual measurement signal generated is not far away (positive case), i.e. within the 3-sigma range or a confidence interval defined otherwise, then the calibration is used. This effectively addresses the risk of incorrect calibrations, in particular due to measurement errors. The quality of the calibration and consequently the detection quality of the gas detection device are increased.

It may also be provided that the measurement signals of the partial injections are automatically compared with one another, in particular for detecting faults during the supply of the sample gas and/or errors in the measurement by means of the detector unit. The result of the comparison can be used to detect a so-called inertia during injection. Such inertia can occur, for example, due to an obstacle in the supply of the sample-gas mixture or calibration gas, if the hose at the inlet is bent, or due to a dust filter/water filter being clogged with particles. If the measurements are performed separately, the error is repeated identically and thus cannot be detected. However, if the calibration gas continues to flow, a change in the results may occur between the individual partial injections during the sequence of partial injections, which then allows the error to be detected, for example, if the deviations between the individual partial injections are above a pre-settable limit. This means that the method is also suitable for fast automatic error detection without burdening the user with additional tasks.

Advantageously, the step of determining a value for a parameter of the calibration (calibration parameter) involves a regression analysis which uses measurement signals of the generated measurement signals and the expected measurement signals. By using both of these types of measurement signals for the regression analysis, it can be based on a larger number of values, which improves the quality of the analysis. In addition, this allows better control of outliers to be achieved in the actual measurement.

It is advantageously provided that the step of calibrating the gas detection device depending on the measurement signals generated by the gas chromatogram comprises the step of automatically determining a value for at least one of the following calibration parameters: response factor ($\alpha$, $\beta$), non-linearity exponent ($\gamma$), dead time ($t_{tot}$), and/or dead volume. This is carried out automatically.

In an advantageous variant, for the calibration more than one, in particular two, sequences each comprising partial injections are carried out in a single pass and recorded together in a gas chromatogram. This allows a rapid calibration to be achieved when using a calibration gas as the sample-gas mixture, wherein in the same way as a typical function test, only one gas chromatogram needs to be created and no additional or intermediate steps are required. In this case, the sample-gas mixtures can differ chemically between the multiple sequences. This mode of usage can be called "fast calibration".

Another useful variant involves determining an effective injection time from multiple partial injections, preferably taking into account the dead time resulting from the dead volume of the injection unit (see above). The actual injection duration can then be determined without distortion due to the dead time, for example. This enables the operation to be precise and reproducible and an extended downward scaling to be achieved, even with diluted sample-gas mixtures. This means that a multi-point calibration can also be implemented. This ultimately allows the dynamic range of the measurement range to be extended. In order to achieve this, a precise determination of the dead time is required, which can be effected in a convenient manner using the method according to the invention as described.

In another advantageous variant, the partial injections can be carried out continuously, preferably with modulation of the interval between the partial injections, in particular depending on the width of the measurement signal, in particular depending on the width of a peak of the measurement signal (peak width), and/or the composition of a substance to be detected in the sample-gas mixture. If a mixture of a carrier gas with only one component to be measured is supplied as the sample-gas mixture, a large number of quantifying measurements can be carried out by continual partial injections, and depending on the composition of the component to be detected in the sample-gas mixture the interval can be varied (e.g. shortened for components with sharply pronounced peaks and/or those with a short retention time). With automated operation and typically a measurement time of around 4 seconds per peak, approximately 20,000 measurements per day can be completed, which is approximately ten times the usual number of measurements using the conventional methods. In this way, high-throughput applications can be used cost-effectively and with little effort.

A machine learning method is preferably used. For this purpose, a random sample with different sample-gas mixtures and a gas chromatogram for each sample-gas mixture is specified in a computer-evaluable form. In a training phase, a classifier is trained with this sample. In a subsequent use phase the trained classifier is applied to the sample-gas mixtures used there.

It is advantageous if the device for calibration comprises a data store in which an expected measurement signal generated by gas chromatography is stored for the partial injections of sample-gas mixture. Furthermore, the device for calibration is equipped with a comparison unit which is designed to compare the actual generated measurement signal with the expected measurement signal during calibration for each partial injection and to calibrate the gas detection device automatically depending on the results of the comparison for the partial injections.

The device for calibration can be designed in particular as a stationary device. It then offers the facility to form a base station to which portable gas detection devices in particular can be temporarily connected for calibration and thus be calibrated in a simple and convenient way.

The gas detection device advantageously has a dedicated power supply unit. This is preferably designed as a set of rechargeable batteries. This further favours the portable use of the gas detection device.

However, an alternative variant may be provided wherein the device for calibration is designed as a separate unit from the gas detection device and is equipped with a coupling device for connection to the gas detection device. The coupling device is preferably designed as a quick-release coupling, which can preferably be operated without tools. It is particularly convenient if the calibration device has a receptacle for the gas detection device to be calibrated, with the coupling device being arranged in or on this receptacle. Preferably, the coupling device is designed in such a way that when the gas detection device is inserted into the receptacle, the coupling device automatically creates a connection between the device for calibration and the gas detection device. If the user has connected the calibration device to the gas detection device to be calibrated by means of the coupling device, they can carry out a calibration themselves in a simple manner. A particular advantage of this is that the same calibration device can be used for multiple gas detection devices one after the other, which offers a considerable advantage, particularly for users with multiple gas detection devices. This allows the users to calibrate independently without needing a separate calibration device for each gas detection device.

BRIEF DESCRIPTION OF THE FIGURES

The invention is elucidated in more detail in the following with reference to the attached drawing and using exemplary embodiments. In the drawings.

DETAILED DESCRIPTION OF THE DISCLOSURE

Figure 1:
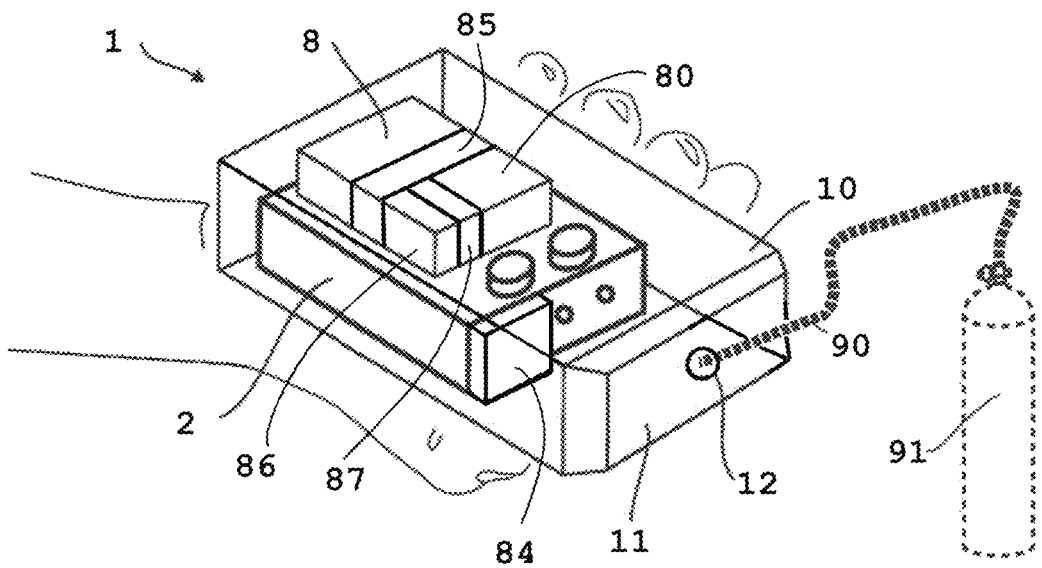
FIG. 1 shows a perspective view of a portable gas detection device with an integrated version of the calibration device.

A portable gas detection device, which in its entirety is referred to by reference sign 1, with a device 8 for calibration integrated therein is shown in FIG. 1.

The gas detection device 1 has a rectangular housing 10, on the front face 11 of which an inlet 12 for supplying a sample-gas mixture is arranged. Inside the housing 10, a measuring device 2 comprising an injection unit 3 and a detector unit for gas chromatography 4, and an evaluation unit 6 which is connected inter alia to the measuring device 2, are arranged. The inlet 12, the injection unit 3, the detector unit 4 for gas chromatography, and the evaluation unit 6 are connected to each other via gas and signal lines, not shown. After the gas mixture has passed through the measurement device 2, it is discharged from the gas detection device 1 via an outlet (not shown). Also provided are a power supply unit 85 for supplying the aforementioned components with electrical energy, a data storage unit 86, a comparison unit 87, and a display device (not shown) which is controlled by the evaluation unit 6.

Figure 2:
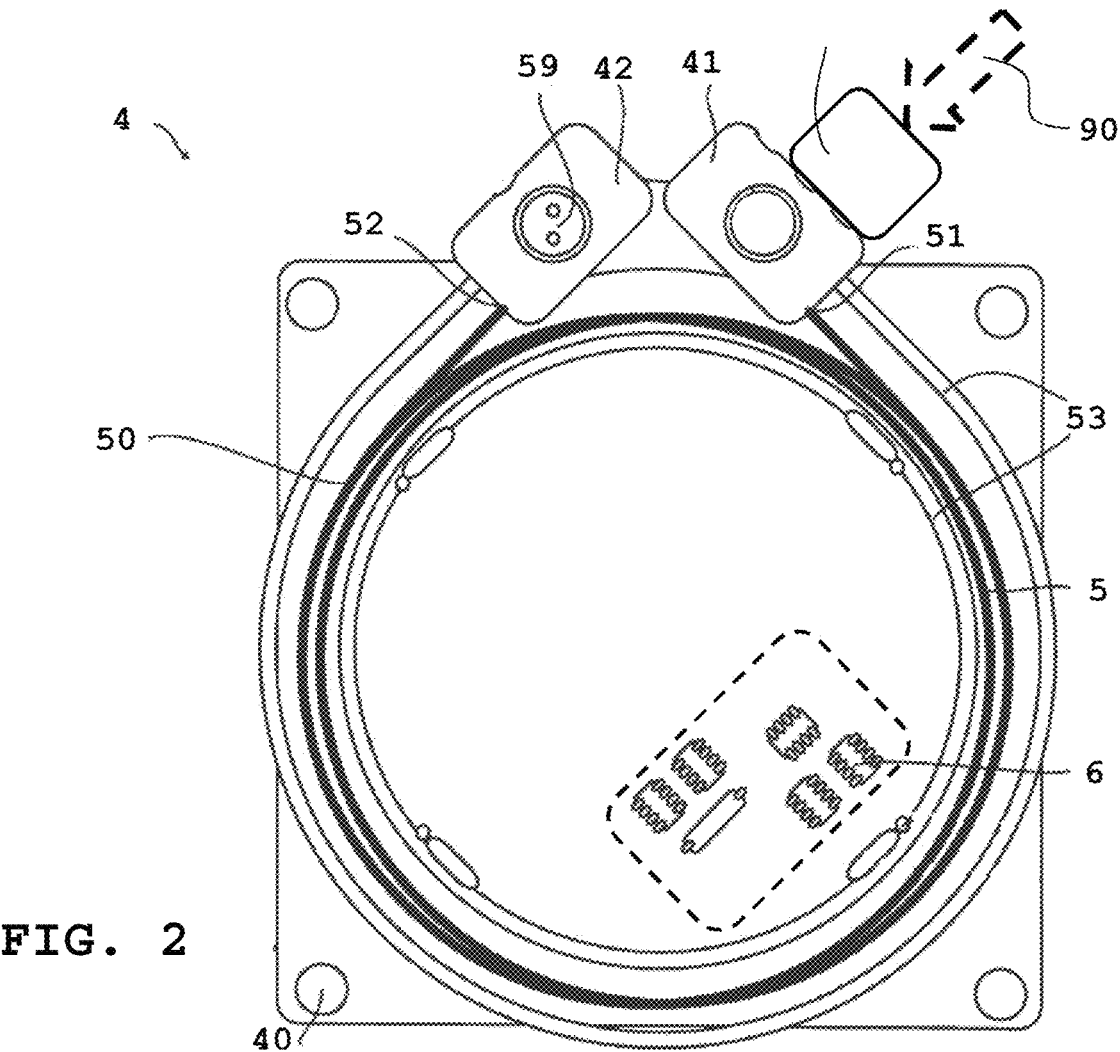
FIG. 2 shows a schematic plan view of an injection unit and detector unit for gas chromatography with an evaluation unit.

The detector unit 4 for gas chromatography is shown schematically in FIG. 2. It comprises a separation column 5 and a detector 59, which are arranged on a common mounting plate 40. The separation column 5 comprises a capillary 50 which is arranged in a protected manner in a surrounding housing 53. The capillary is connected at its start 51 to a starting connection block 41. The injection unit 3 is arranged on this starting connection block 41 and supplies the sample-gas mixture to be analysed so that it flows via the starting connection block 41 into the capillary 50 of the separation column 5. The capillary 50 is connected at its end 52 to an end connection block 42 on which the detector 59 is arranged, which in the exemplary embodiment is designed as a photo-ionisation detector. From there, the gas mixture flows via a connection, not shown, to the outlet (not shown). The evaluation unit 6, which is connected inter alia to the detector 59 by means of signal cables not shown, is also arranged on the mounting plate 40.

The following relationships apply to the interaction between detector unit 4, separation column 5 and evaluation unit 6:

In a linear system, the following would be true $$ppm = \alpha \cdot \frac{A_{lin}}{t_t - t_{tot}} \quad (1)$$

where ppm is the concentration, $\alpha$ is a conversion factor, and $A_{lin}$ is the area of the measurement signal peak.

Assume the measured area of a measurement signal peak to be A. Instead of the injection time, the injection volume V can also be used, where the following applies:

$$A(ppm, t_t-t_{tot}) = A(ppm, \dot{V} \cdot (t_t-t_{tot})) = A(ppm, V_t-V_{tot}) \quad (2)$$

If the shape of the signal at the detector is constant, the following formula applies. For example, the shape of the signal is constant if the column diffusion is the dominant shape. This allows the concentration to be scaled by a factor s over the injection amount:

$$A(s \cdot ppm, t_t-t_{tot}) = A(ppm, s \cdot (t_t-t_{tot})) \quad (3)$$

Here, the area A is not linearly related to the concentration, as shown here using the example of an exponential function $$A_{lin} = A_0 \cdot \left(\frac{A}{A_0}\right)^\gamma = A_0^{1-\gamma} \cdot A^\gamma \quad (4)$$

where $A_0$ is the fixed point of the correction and $\gamma$ is the non-linear coefficient.

Inserting equation (4) into (1) results in:

$$ppm \cdot (t_t-t_{tot}) = \propto \cdot A_0^{1-\gamma} \cdot A(ppm, t_t-t_{tot})^\gamma \quad (5)$$

The factors cannot and need not be determined individually, but can be summarized as $\beta$:

$$\beta = \propto \cdot A_0^{1-\gamma} \quad (6)$$

Substitution with equation (6) ultimately results in the formula for the concentration $$ppm(t_t-t_{tot}) = \beta \cdot A(ppm, t_t-t_{tot})^\gamma \quad (7)$$

with the parameters to be determined $\beta$ and $\gamma$, which are the object of the calibration.

To perform the calibration, the device 8 for calibration is provided, which is integrated into the housing 10 in the embodiment according to FIG. 1. The integrated device 8 for calibration comprises a signal-processing calibration control unit 80 and cooperates with the injection unit 3, via which the sample-gas mixture used for the calibration is fed into the detector unit for gas chromatography 4. The calibration gas is supplied from a gas cylinder 91, which is preferably filled with a gas standard. From the gas cylinder 91, the sample-gas mixture is fed via a connecting hose 90 to the port 12 of the gas detection device 1 and from there to the injection unit 3. The device 8 for calibration comprises a serial impact generator 84, which controls the injection unit 3 in such a way that the injection of calibration gas into the separation column 5 takes place in a sequence of partial injections.

Figure 3A:
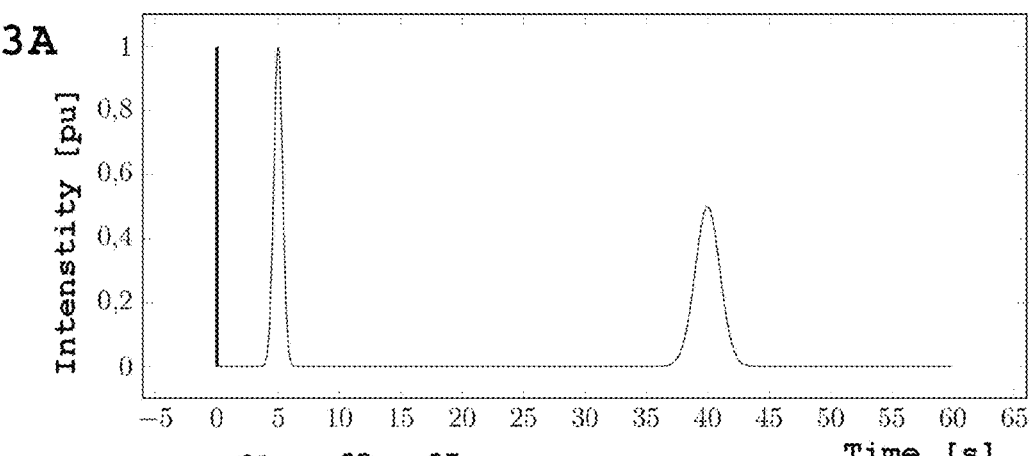
FIGS. 3A and 3B show gas chromatograms for single injection (FIG. 3A) and injection by means of five partial injections (FIG. 3B) of a sample gas having two components.
Figure 3B:
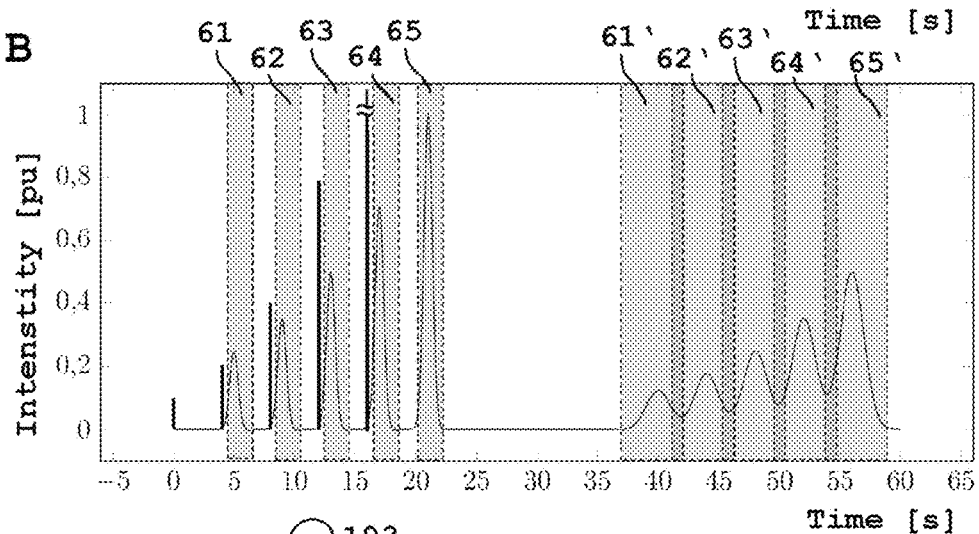

The injection of the sample-gas mixture for calibration into the separation column 5 of the detector unit 4 via the injection device 3 and examples of a resulting gas chromatogram for a sample-gas mixture with two components are shown in FIGS. 3A and 3B. FIG. 3A shows a conventional operation, wherein the amount of gas to be analysed is injected in a single action at time t=0 (the time of the injection is marked by a vertical line). The two components of the sample-gas mixture pass through the capillary 50 of the separation column 5 at different speeds, so that at time t=5 seconds the detector 59 detects a signal peak as the measurement signal for a first sample-gas component, namely a faster component, and a (broader) signal peak for a second sample-gas component, namely a slower component, is detected by the detector 59 at time t=40 seconds. So far, this is the same as a conventional gas chromatogram and therefore does not require further explanation.

In comparison, FIG. 3B shows how the sample-gas mixture is fed according to the invention via the injection unit 3, namely as a sequence of partial injections clocked by the serial impact generator 84. In the exemplary embodiment shown, this is effected by means of five partial injections. In the example shown, the partial injections are carried out at intervals of approximately 4 seconds. The nominal amounts of the individual partial injections are set by the calibration control unit 80 by different time periods $t_i$ for the individual partial injections. In this case:

In order to be able to accurately measure with the lowest possible number of partial injections, the injection volumes advantageously form an exponential sequence. This is due to the non-linear transfer function of the detector, which has the form $y=\alpha \cdot x^\gamma$ as described above. The logarithmic relation $\log(x^\gamma)=\log(x) \gamma$ provides a desired linearity with respect to the parameter $\gamma$. It should also be observed that the injection quantities of the partial injections must be greater than the estimated dead volume of the injection $V_{tot}$ and therefore the injection duration must be greater than the resulting dead time $t_{tot}$. An example of a useful sequence of injection amounts for the partial injections is that each of the partial injections is greater than the preceding one by a constant factor, for example by a factor of two. This results in the exponential sequence for the duration of injection of the respective partial injections: 0.1 s/0.2 s/0.4 s/0.8 s/1.6 s. The injection duration (duration of the respective partial injections) is a measure of the nominal injection quantities of the partial injections.

This (exponential) sequence for the injection times of the partial injections is symbolically illustrated in FIG. 3B by the length of the vertical lines, which represent the individual (here: five) partial injections. It should be noted that the line associated with the fifth partial injection is truncated for reasons of clarity; the value is 1.6 corresponding to a duration of 1.6 seconds. The measurement signals are represented by the curve showing multiple peaks (measurement signal peaks).

To assign the measurement signals acquired by the detector 59 to the partial injections, the evaluation unit 6 is designed to form a set of evaluation periods 61, 62, 63, 64 and 65 for the detector 59. The samplings of the measurement signal performed during each of the evaluation periods are each assigned to one of the partial injections. In a similar way a second set of evaluation periods 61', 62', 63', 64', 65' is formed for the second, slower sample-gas component.

The individual evaluation periods 61, 62, 63, 64, 65 of the first set for the faster first component in the sample-gas mixture do not overlap. Each evaluation period includes a measurement signal peak of the respective partial injection for the first component of the sample gas.

By contrast the evaluation periods 61', 62', 63', 64', 65' of the second set overlap, in the example shown only slightly (less than 25% of the respective period). This is due to the fact that for the second slower component the corresponding measurement signal peaks recorded by the detector 59 are broader. The measurement signal peaks for the second component are recorded in the gas chromatogram according to FIG. 3B starting from the time t=40 seconds. Again, the five peaks for the five partial injections can be identified.

The peaks are assigned to the individual partial injections automatically by means of a calibration control unit 80, for example by maximum detection or by regression methods. This can also be used to separate measurement signal peaks, which due to flattened trailing edges merge into the respective subsequent measurement signal peak. Once the individual measurement signal values for the partial injections have been determined and assigned, the parameters for the calibration are determined (see in particular parameters $\gamma$ and $\alpha$ or $\beta$ and dead time $t_{tot}$ as explained above), preferably also using the calibration control unit 80.

Figure 4:
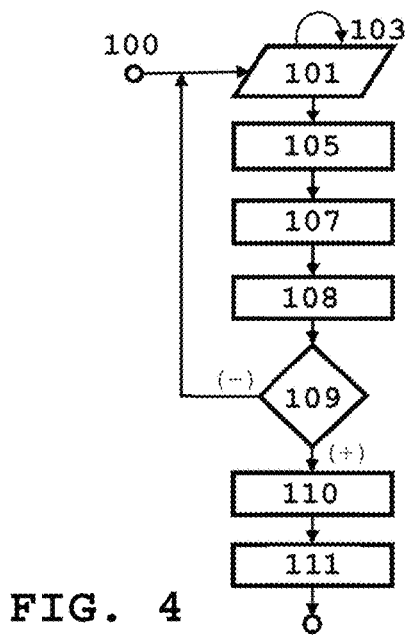
FIG. 4 shows method steps for an exemplary embodiment of the calibration method according to the invention.

The method is summarised graphically in the flowchart according to FIG. 4. At the start 100, a gas chromatogram 101 is created in a first step, by supplying the sample-gas mixture used for calibration with m components. This is injected by means of a series of n partial injections, for which step 103 is accordingly iterated n times. A gas chromatogram as shown in FIG. 3B is then produced. It contains m*n peaks, in the gas chromatogram shown in FIG. 3B, therefore, 10 peaks for m=2 components in n=5 partial injections. They are automatically detected by maximum detection in step 105, and n peaks of m groups each are automatically assigned in step 107 using the non-overlapping evaluation periods (first set 61-65) or only slightly overlapping evaluation periods (second set 61'-65'), in this case five peaks in two groups. In step 108, expected measurement signals for the partial injections are retrieved from the data store 86 and in step 109 they are compared with the actual measurement signals determined according to step 107. If the comparison using the comparison unit 87 results in a deviation above a pre-settable tolerance value (negative case), the measurement signals are discarded and the method begins again. Otherwise, in the positive case, in step 110 the parameters $\alpha$ or $\beta$ as well as dead time $t_{tot}$ for calibrating the gas detection device are obtained by regression using the formulas explained above, and finally stored in the gas detection device 1, in particular its evaluation unit 6, as calibration values in step 111.

Figure 5:
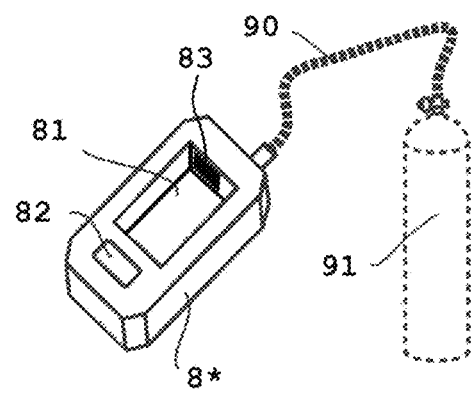
FIG. 5 shows a perspective view of a further embodiment with a separate device for calibration.

FIG. 5 shows a second embodiment according to an alternative variant, in which the device for calibration is implemented separately from the gas detection device. This device 8* for calibration can in particular be a stationary device and thus a base unit to which, in particular, portable gas detection devices can be temporarily coupled in order to be calibrated. In this case, the device 8* for calibration is also connected via a connecting hose 90 to a gas cylinder 91 which contains sample-gas mixture for the calibration, preferably according to a gas standard. In addition, the device 8* for calibration has a coupling device 81 which is designed to accommodate a gas detection device 1. It is designed in the shape of a trough, so that the gas detection device 1 to be calibrated can be used for the calibration, and has ports (not shown) so that, with the gas detection device 1 inserted, its inlet 12 can be connected to the device 8* for calibration and its sample gas supply to the gas cylinder 91 connected there. The ports are designed in such a way that upon insertion the corresponding mechanical connection is automatically made. In addition, the coupling device 81 has connecting means 83 for signal connections.

By means of an operating button 82 arranged on the device 8* for calibration, the supply of the sample-gas mixture can be enabled and the inserted gas detection device can be activated accordingly and its measurement signals read out. The calibration control unit 80 of the device 8* for calibration then determines the measurement signals and their signal peaks from the measured signals in the manner as described above, and calculates the said parameters for the calibration, which are finally transferred via the connecting means 83 of the coupling device 81 to the inserted gas detection device 1 and stored there. The gas detection device 1 is thereby calibrated. It can be removed and the next gas detection device to be calibrated can be inserted into the device 8* for calibration and calibrated. This enables a convenient calibration of a relatively large number of gas detection devices 1 with only one device 8* for calibration.

The invention claimed is:

1. A method for calibrating a gas detection device comprising a measuring chamber, wherein the gas detection device is designed to generate a gas chromatogram from a gas mixture located in the measuring chamber, the method comprising:
   conveying a sample-gas mixture to the measuring chamber via a sequence comprising at least two consecutive partial injections,
   each partial injection of the sequence comprising:
      injecting a specified amount of the sample-gas mixture into the measuring chamber, and
      generating, by the gas detection device, at least one measurement signal for the partial injection via gas chromatography,
   wherein a measurement signal for at least one component of the sample-gas mixture injected during this partial injection correlates with the presence and/or concentration of the at least one component,
   wherein between two consecutive partial injections of the sequence a pause is applied in which no sample-gas mixture is injected, and
   wherein the method further comprises automatically calibrating the gas detection device depending on the at least one generated measurement signal for the partial injections.

2. The method of claim 1, wherein in two different partial injections of the sequence of partial injections at least two different amounts of the sample-gas mixture and/or two amounts of the sample-gas mixture are injected during two different time periods.

3. The method of claim 1, wherein the sequence comprises a first, a second and a third partial injection, the second partial injection starting after an end of the first partial injection and the third partial injection starting after an end of the second partial injection.

4. The method of claim 3, wherein the second partial injection lasts longer than the first partial injection and/or a larger amount is injected during the second partial injection than during the first partial injection, and the third partial injection lasts longer than the second partial injection and/or a larger amount is injected during the third partial injection than during the second partial injection.

5. The method of claim 4, wherein in the second partial injection the amount injected is at least one and a half times as large as in the first partial injection and in the third partial injection the amount injected is at least one and a half times as large as in the second partial injection.

6. The method of claim 5, wherein the amount injected in the second partial injection is greater by a factor than the amount injected in the first partial injection, and the amount injected in the third partial injection is greater than the amount injected in the second partial injection by the same factor, where the factor is greater than or equal to two.

7. The method of claim 5, wherein the amount injected in the second partial injection is at least twice as large as in the first partial injection.

8. The method of claim 5, wherein the amount injected in the third partial injection is at least twice as large as in the second partial injection.

9. The method of claim 1, wherein a time period that elapses between a start of the first partial injection and an end of the last partial injection is less than a longest expected retention time of a component of the sample-gas mixture by the gas detection device.

10. The method of claim 1, wherein each partial injection is assigned at least one evaluation period, and wherein the step in which the gas detection device generates the measurement signal for a partial injection comprises the step that the gas detection device generates at least one measurement signal by sampling in each of at least one evaluation periods.

11. The method of claim 10, wherein, in each partial injection a mixture comprising a first sample-gas component and a second sample-gas component is injected as the sample-gas mixture, so that in each partial injection at least both the first sample-gas component and the second sample-gas component are injected, the second sample-gas component being different from the first sample-gas component, and each partial injection is assigned a first evaluation period and a second evaluation period, and
   wherein each measurement signal generated by sampling in the respective first evaluation period relates to the first sample-gas component and each measurement signal generated by sampling in the respective second evaluation period relates to the second sample-gas component.

12. The method of claim 8, wherein a temporal gap occurs between the two first evaluation periods assigned to two directly consecutive partial injections and the two second evaluation periods assigned to two directly consecutive partial injections overlap in time.

13. The method of claim 12, wherein a time gap occurs between the first evaluation period and the second evaluation period that are assigned to the same partial injection.

14. The method of claim 10, wherein the step in which the gas detection device generates the measurement signal for a partial injection comprises the step that the gas detection device generates at least one measurement signal by sampling in each evaluation period to which the partial injection is assigned.

15. The method of claim 1, wherein, for each partial injection an expected measurement signal is specified for the amount of the sample-gas mixture injected during this partial injection and the measurement signal generated for this partial injection is compared with the expected measurement signal, and
   wherein the step of calibrating the gas detection device depending on the generated measurement signals comprises the step that the gas detection device is calibrated depending on the results of the comparison for the partial injections.

16. The method of claim 1, wherein the step of calibrating the gas detection device depending on the measurement signals generated by the gas chromatogram comprises the step of automatically determining a value for at least one of the following calibration parameters:
   response factor ($\alpha$, $\beta$),
   non-linearity exponent ($\gamma$),
   dead time ($t_{tot}$), and
   dead volume.

17. A device for calibrating a gas detection device, wherein the gas detection device comprises a measuring chamber and is designed to generate a gas chromatogram from a gas mixture in the measuring chamber, wherein the device for calibrating comprises an injection unit and a serial impact generator, the injection unit being configured to inject a sample-gas mixture into the measuring chamber, and wherein the serial impact generator is configured to control the injection unit in such a way that the controlled injection unit performs a sequence of at least two consecutive partial injections, wherein the controlled injection unit is configured to inject a specified amount of the sample-gas mixture into the measuring chamber in each partial injection, wherein the gas detection device is configured to generate at least one measurement signal for each partial injection via gas chromatography, wherein the at least one measurement signal for at least one component of the sample-gas mixture injected during this partial injection correlates with the presence and/or concentration of the at least one component, wherein the serial impact generator is configured to control the injection unit in such a way that between two consecutive partial injections of the sequence a pause is applied, in which the injection unit does not inject the sample-gas mixture, and wherein the device for calibrating is configured to calibrate the gas detection device automatically depending on the generated measurement signals for the partial injections.

18. A gas detection device comprising a measuring chamber and the device for calibration of claim 17, wherein the gas detection device is configured to generate the gas chromatogram from the gas mixture located in the measuring chamber.

\* \* \* \* \*